United States Patent

Newman, Jr.

[11] 3,860,372
[45] Jan. 14, 1975

[54] ADJUSTABLE FEEDBLOCK FOR ENCAPSULATED MULTILAYER EXTRUSION

[75] Inventor: Ritchey O. Newman, Jr., Midland, Mich.

[73] Assignee: The Dow Chemical Company, Midland, Mich.

[22] Filed: Nov. 7, 1972

[21] Appl. No.: 304,505

Related U.S. Application Data

[63] Continuation-in-part of Ser. No. 119,106, Feb. 26, 1971, abandoned.

[52] U.S. Cl.............. 425/133.1, 425/463, 425/466
[51] Int. Cl................................................ B29f 3/04
[58] Field of Search .......... 425/131, 133, 463, 466, 425/462, 465

[56] References Cited
UNITED STATES PATENTS

| | | | |
|---|---|---|---|
| 2,957,201 | 10/1960 | Fields et al. | 425/133 X |
| 3,221,371 | 12/1965 | Stevens | 425/466 X |
| 3,264,686 | 8/1966 | Soloduk | 425/466 |
| 3,321,803 | 9/1967 | Corbett | 425/133 X |
| 3,397,428 | 8/1968 | Donald | 425/133 |
| 3,447,204 | 6/1969 | Lainson | 425/133 |
| 3,504,402 | 4/1970 | Wetz | 425/131 |
| 3,608,136 | 9/1971 | Tripptrap | 425/466 |
| 3,754,847 | 8/1973 | Sawada et al. | 425/131 |

Primary Examiner—Andrew R. Juhasz
Assistant Examiner—David B. Smith
Attorney, Agent, or Firm—William M. Yates; Robert W. Selby; Lloyd S. Jowanovitz

[57] ABSTRACT

A device is described to alter the cross-section of an extruded resinous encapsulating coating without altering substantially the cross-sectional configuration of a core resinous material. The device comprises a body having a core passage extending from an inlet to an outlet, a coating passage spaced apart from and surrounding at least the outlet of the core passage by a wall section, and an adjusting means to alter the cross-section of a resin flowing through the coating passage.

21 Claims, 5 Drawing Figures

PATENTED JAN 14 1975

3,860,372

INVENTOR.
Ritchey O. Newman, Jr.
BY
Griswold & Burdick
ATTORNEYS

ADJUSTABLE FEEDBLOCK FOR ENCAPSULATED MULTILAYER EXTRUSION

The present application is a continuation-in-part of my previous application Ser. No. 119,106 filed Feb. 26, 1971, and now abandoned.

BACKGROUND OF THE INVENTION

This invention pertains to plastic shaping and more particularly to continuously forming thermoplastic compositions having an encapsulated cross-section.

It is oftentimes desirable to encapsulate extrudable resinous or thermoplastic substances within a dissimilar resinous or thermoplastic substance to provide the desired characteristics, such as, enhanced corrosion protection of the encapsulated substance. This has previously been accomplished by supplying a hot thermoplastic material to a feeder die to form an encapsulated structure. From the feeder die, or feedblock, the structure passed to an extrusion die to form an encapsulated shaped article, for example, a film, filament, or sheet.

Frequently, it is necessary to remove or trim a portion of the encapsulating layer to expose the interior resinous or thermoplastic film. It is desirable that the amount trimmed, be held to a minimum to reduce the scrap loss. This can be accomplished by fabricating a feeder die for each size extruded. However, this can frequently result in a large supply of feeder dies being required, high labor costs, and excessive machine down-time to change feeder dies.

It is, therefore, an object of this invention to provide a device capable of preforming an encapsulated structure, having a minimum of trimming scrap from the final extruded product, without necessitating the fabrication of a new feeder die for each extruded size.

Other objects and advantages of this invention will become apparent during the course of the following description.

SUMMARY OF THE INVENTION

The above objects have been achieved in a device comprising a body defining a first core passage extending from an inlet to a first outlet and a coating passage spaced apart from the first core passage by a wall section. The coating passage has a feed port adapted to communicate with a second outlet surrounding the first outlet. The first core passage is suited to pass a first resinous material therethrough; the coating passage is suited to pass a second resinous material therethrough to encapsulate the first resinous material upon exit from the first outlet. The body further defines at least one adjusting means in operative combination with a wall portion of the coating passage adapted to alter the geometry of the coating passage at least partially adjacent to the second outlet without altering the geometry of the first outlet by generally lateral movement of the coating passage wall portion. Beneficially, the adjusting means is in operative combination with an outer wall portion of the coating passage.

The herein described device can be effectively employed in a method which comprises supplying resinous materials in heat plastified states and transferring the plastified resinous materials to the device. The resinous materials can be passed through the first core passage and the coating passage. Upon egress from the device the elongated resinous material can, optionally, be passed through a combining die prior to extruding the elongated resinous materials through an extrusion die to form encapsulated structures of a predetermined cross-sectional configuration.

A single resinous composition or more desirably at least two dissimilar heat plastified resinous substances can be beneficially employed in the above-described method. The resinous substances can be dissimilar in properties such as chemical composition, physical properties, and/or appearance.

DESCRIPTION OF THE DRAWINGS

The accompanying drawings further illustrate the invention.

Identical numerals, distinguished by a letter suffix, within the several figures represent parts having a similar function within the different embodiments.

DESCRIPTION OF THE PREFERRED EMBODIMENTS

Figure 1:
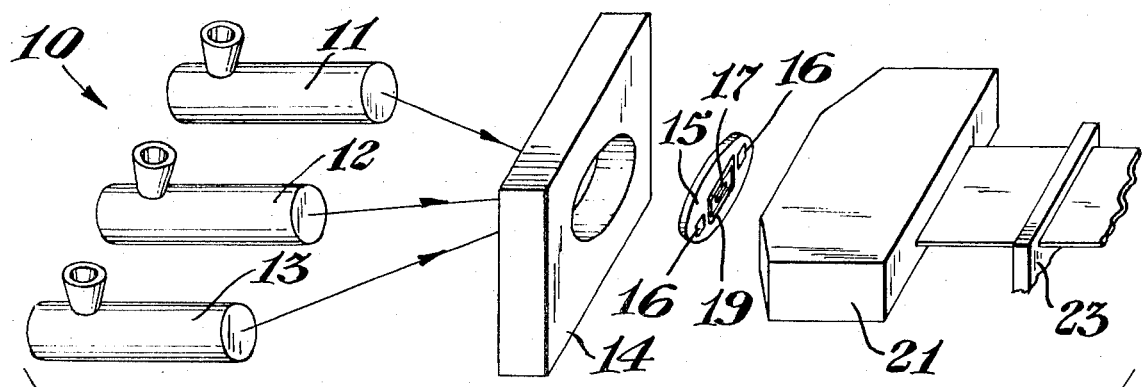
FIG. 1 is an exploded schematic representation of the method and apparatus employing the body of the invention.

In FIG. 1 there is schematically depicted a basic apparatus 10 employing the feedblock of the invention. The apparatus comprises in cooperative combination a first source of heat plasticized thermoplastic resinous material 11 and second and third sources of heat plasticized thermoplastic resinous materials 12 and 13, respectively. A holder member 14 provides a means to support a body or feedblock 15, which includes therein a first core passage 17 and a hollow, generally rectilinear shaped coating passage 19 through which the first and second plastified thermoplastic resins can be passed into a stream of a desired configuration, and two adjusting means 16. The second resin passed through the coating passage 19 at least partially encapsulates the first resin passed through the first core passage 17.

To minimize turbulent flow from the body 15 to an extrusion die 21, a combining die or adaptor (not shown) can, optionally, be positioned between the body 15 and the extrusion die 21 to direct the resinous stream to an orifice in the extrusion die 21.

The extrusion die 21 is positioned to accept the stream formed after flowing of the resinous materials through the passages 17 and 19. After the resinous material flows through the body 15, the extrusion die 21 forms the resinous material into an encapsulated structure of a predetermined cross-sectional configuration.

The encapsulated structure can be passed through a slicer 23 to remove excess encapsulating second resinous material from, for example, the edge of the structure.

The device is constructed of a structural material which is substantially chemically and physically inert to the resinous material or the process operating conditions, such as temperature and atmosphere. Preferably such structural material is a metal or alloy such as steel, nickel, and the like.

Figure 3:
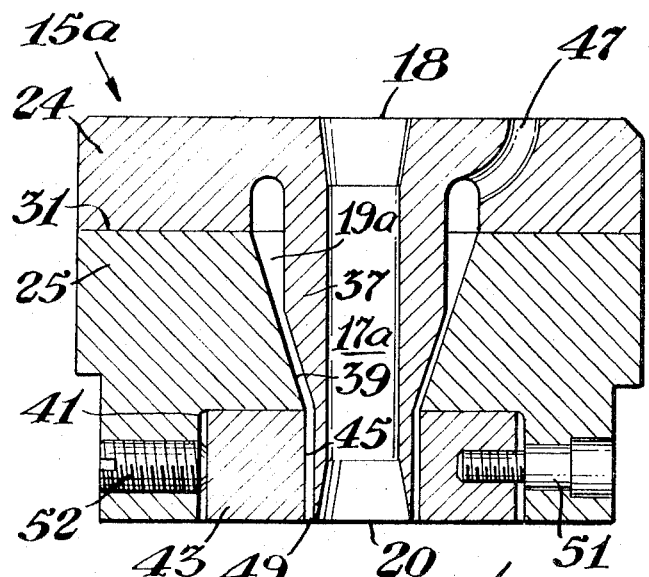
FIG. 3 is a sectioned transverse view of the embodiment of FIG. 2 along plane 3—3.
Figure 2:
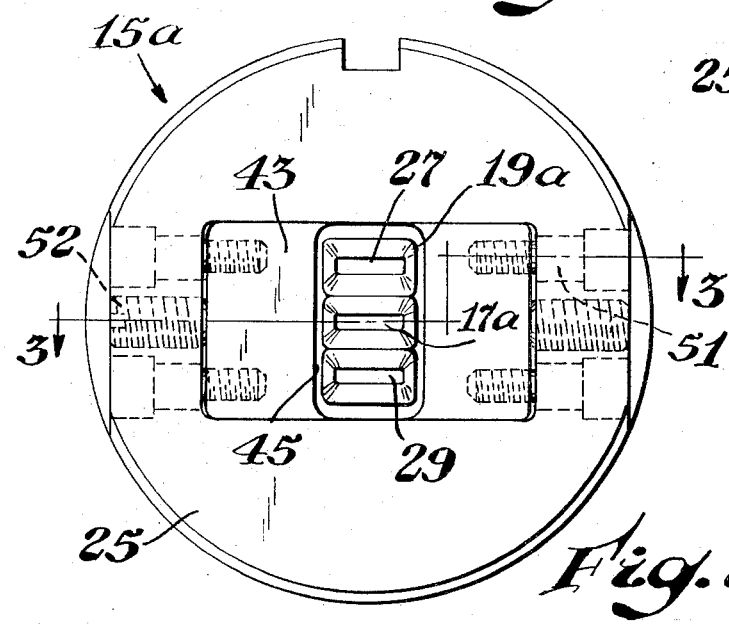
FIG. 2 is an end view of a feedblock useful in the apparatus of FIG. 1.

FIGS. 2 and 3 are illustrative of a regularly shaped body 15a, comprising an insert 24 positioned within a receiver 25. The insert 24 defines at least one first core passage 17a having an inlet 18 and an outlet 20. The insert 24 further optionally defines a multiplicity of core passages, herein exemplified by second core passage 27 and third core passage 29. The insert 24 is detachably attached to the receiver 25 along an insert surface 31. Optionally the insert 24 is integrally secured to the receiver 25. A wall section or portion 37, protruding from the insert 24 defines the inner surface of a hollow, generally rectangular shaped coating passage 19a. An interior wall surface 39 of the insert 24 and the receiver 25 define the outer periphery of the coating passage 19a. A recess 41 in the receiver 25 is adapted to accept an outer wall block 43 having an outer wall portion 45 to further delimit the bounds of the coating passage 19a. The coating passage 19a is generally coaxially positioned around the first core passage 17a and extends from at least one feed port 47, herein defined by insert 24, to a second outlet 49 surrounding the wall portion 37 and the outlet 20 of the first core passage 17a. An adjusting means including the outer wall block 43 and a force applicator, such as a clamp, screw, hydraulic piston, or tension bolt 51 and a compression bolt 52, are in operative combination with the outer wall portion 45. Preferably two adjusting means are employed to alter the cross-sectional geometry of two spaced apart, generally opposing portions of the coating passage 19a.

In operation, the tension bolt 51 can be rotated to cause the outer wall portion 45 to move outwardly in relation to the coating passage 19a. The compression bolt 52 can be rotated to cause the outer wall portion 45 to move inwardly in a direction generally normal or perpendicular to the axis of the coating passage 19a. The outlet geometry of the coating passage 19a can be thereby varied. Furthermore, by the uniform movement of the force applicator, that is the tension bolt 51 and the compression bolt 52, the outlet geometry of the coating passage 19a can be controllably varied during the extrusion process. The final cross-sectional configuration of the second thermoplastic resinous material passing through the coating passage 19a from the feed port 47 to the second outlet 49 can be controlled by movement of the adjusting means. The second thermoplastic resinous material passed through the coating passage 19a can at least partially encapsulate the first thermoplastic resinous material substantially simultaneously passed through the first core passage 17a and, optionally, third and fourth thermoplastic resinous materials passed through the third and fourth core passages 27 and 29.

Figure 4:
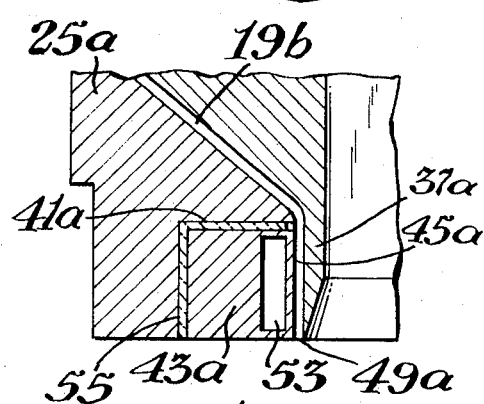
FIGS. 4 and 5 are partial transverse sections of alternate embodiments of the adjusting means.

FIG. 4 is a cross-sectional view of another embodiment of an adjusting means to modify the cross-section of the second thermoplastic resinous material flow. In this embodiment the adjusting means comprises an outer wall block 43a, which defines a conduit 53 for conducting a heat source fluid. An outer wall block 43a is positioned in a recess 41a in a receiver 25a. A dimensionally heat sensitive outer wall portion 45a of the wall block 43a can be of material which effectively expands upon an increase in temperature and effectively contracts upon cooling and is substantially stable to the corrosive effects of the second resinous material at the extrusion temperatures employed.

To facilitate greater movement of the outer wall portion 45a, an optional thermal barrier 55 is positioned between the recess 41a and the outer wall block 43a. The thermal barrier can be an air space or material, such as asbestos, which inhibits loss of heat from the outer wall block 43a and the wall portion 45a into the receiver 25a.

The embodiment of FIG. 4 can be employed to vary the outlet geometry of a coating passage 19b to regulate the cross-sectional configuration of a second thermoplastic resinous material passed through the coating passage 19b before the second resinous material encapsulates or coats the first resinous material. A heated fluid, such as oil, is passed through conduit 53 to modify the temperature of the outer wall block 43a and the wall portion 45a causing expansion thereof. As the outer wall block 43a expands, the inner wall portion 45a moves inwardly toward a wall section 37a effecting a reduction in the cross-section of an outlet 49a of the coating passage 19b. This embodiment is beneficial when the force applicator heretofore described in the embodiment of FIG. 2 is undesired or cannot be effectively utilized in combination with the specific extrusion equipment.

Figure 5:
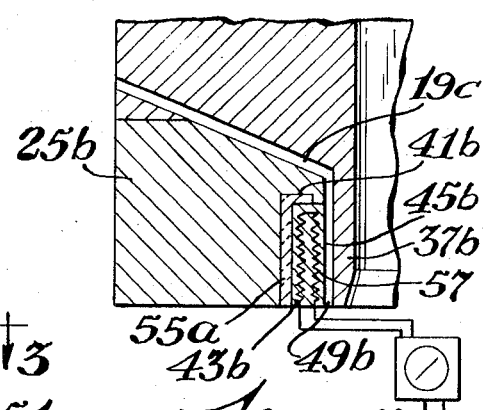

FIG. 5 depicts a receiver 25b having an optional receiver 41b for placement of an adjusting means including an optional outer wall block 43b. In this embodiment a regulatable heating means, such as electric heating source 57, is positioned within the receiver 25b or the optional outer wall block 43b adjacent to a substantially dimensionally heat stable outer wall portion 45b of the receiver 25b or the optional wall block 43b. An outer wall portion 45b and an inner wall section 37b define an outlet 49b of a coating passage 19c.

In operation, the electric heat source 57 can be heated to cause a resultant regulatable increase in temperature of the dimensionally heat stable outer wall portion 45b. The magnitude of the temperature increase of the wall portion 45b is at least partially dependent upon the heat transfer characteristics of said outer wall portion and the heat flow from the optional outer wall block 43b to the receiver 25b. As previously described in the embodiment of FIG. 4 an optional thermal barrier 55a between the receiver 25b and the outer wall block 43b can reduce the heat transfer rate therebetween and increase the effective heat content of the outer wall portion 45b.

In FIG. 5 the flow characteristics of a second thermoplastic resinous material flowing through the coating passage 19c, alters as it contacts the heated outer wall portion 45b. The change in flow characteristics of the thermoplastic resinous material can alter the cross-sectional configuration of the final extruded product without necessitating a significant change in the outlet geometry of the coating passage 19c by movement of the outer wall portion 45b. The embodiment of FIG. 5 is beneficial when it is undesirable to have movement of a wall portion within the encapsulating feedblock device.

In normal use, the feedblock device will frequently include a multitude of core passages through which at least two dissimilar resinous materials can be simultaneously passed and encapsulated by a dissimilar resinous material simultaneously passed through a passage surrounding the multitude of core passages at least at the outlet of said multitude of core passages. The instant invention does, though, include a device having a single central passage and a generally coplanerly positioned second passage through which a single resinous material is extruded.

As is apparent from the foregoing specification, the device of the present invention is susceptible of being

What is claimed is:

1. A feedblock comprising a body defining: a core passage suited to pass a first resinous material therethrough extending from an inlet to a first outlet; a hollow, generally rectilinear shaped coating passage spaced apart from the core passage by a wall section, the coating passage having a feed port adapted to communicate with a second outlet surrounding the first outlet and suited to pass a second resinous material therethrough; and two adjusting means in operative combination with a wall portion of the coating passage adapted to independently alter the cross-sectional geometry of two spaced apart, generally opposing transverse portions of the coating passage at least partially adjacent to the second outlet without altering the geometry of the first outlet by generally lateral movement of the wall portion of the coating passage to thereby minimize edge scrap loss of the second resinous material passed through the coating passage.

2. The feedblock of claim 1 wherein the adjusting means includes a force applicator adapted to move an outer wall block to vary the geometry of the coating passage.

3. The feedblock of claim 1 wherein the adjusting means includes a force applicator adapted to move an outer wall block to vary the geometry of the coating passage.

4. The feedblock of claim 3 wherein the force applicator is adapted to move the outer wall block in a direction generally normal to the axis of the core passage.

5. The feedblock of claim 1 wherein the structural material is a metal.

6. The feedblock of claim 1 wherein the core and coating passages are adapted to provide a structure wherein the first resinous material is encapsulated by the second resinous material.

7. The feedblock of claim 1 including a multiplicity of core passages.

8. The feedblock of claim 1 wherein the adjusting means is adapted to controllably alter the outlet geometry of the coating passage.

9. The feedblock of claim 1 wherein the adjusting means is adapted to alter only a portion of the coating passage geometry.

10. The feedblock of claim 1 wherein the adjusting means is adapted to alter only a portion of the coating passage geometry.

11. The feedblock of claim 1 wherein the adjusting means are adapted to controllably alter the outlet geometry of the coating passage.

12. The feedblock of claim 1 wherein the core passage is generally rectangular in shape.

13. In a feedblock for multilayer extrusion of thermoplastic compositions comprising a body defining: a core passage suited to pass a first resinous material therethrough extending from an inlet to a first outlet; and a coating passage spaced apart from the core passage by a wall section, the coating passage having a feed port adapted to communicate with a second outlet surrounding the first outlet and suited to pass a second resinous material therethrough; the improvement comprising two spaced apart adjusting means in operative combination with an outer wall portion of the coating passage adapted to independently alter the cross-sectional geometry of generally opposite transverse portions of the coating passage at least partially adjacent to the second outlet without altering the geometry of the first outlet by generally lateral movement of the wall portion of the coating passage, the adjusting means comprising an outer wall block positioned within a recess in a receiver of the body and a force applicator in operative combination with the outer wall portion to thereby minimize edge scrap loss of the second resinous material passed through the coating passage.

14. The improvement of claim 13 wherein the force applicator is adapted to move the outer wall block in a direction generally normal to the axis of the core passage.

15. The improvement of claim 14 wherein the coating passage has a hollow, generally rectangular configuration generally coaxially positioned around the core passage.

16. The improvement of claim 15 including two spaced apart adjusting means adapted to alter the cross-sectional geometry of generally opposite portions of the coating passage.

17. The improvement of claim 13 including a multiplicity of core passages.

18. In a feedblock for multilayer extrusion of thermoplastic compositions comprising a body defining: a core passage suited to pass a first resinous material therethrough extending from an inlet to a first outlet; and a hollow coating passage of a generally rectangular configuration generally coaxially positioned around the core passage and spaced apart from the core passage by a wall section, the coating passage having a feed port adapted to communicate with a second outlet surrounding the first outlet and suited to pass a second resinous material therethrough; the improvement comprising two spaced apart adjusting means in operative combination with an outer wall portion of the coating passage adapted to selectively alter the cross-sectional geometry of generally opposite portions of the coating passage at least partially adjacent to the second outlet without altering the geometry of the first outlet by generally lateral movement of the wall portion of the coating passage, the adjusting means being further adapted to alter only a portion of the coating passage geometry, the adjusting means comprising an outer wall block positioned within a recess in a receiver of the body and a force applicator in operative combination with the outer wall portion, the force applicator being adapted to move the outer wall block in a direction generally normal to the axis of the core passage.

19. The feedblock of claim 18 wherein the adjusting means are adapted to independently alter the cross-sectional geometry of a transverse portion of the coating passage to thereby minimize edge scrap loss of the second resinous material passed through the coating passage.

20. In a feedblock for multilayer extrusion of thermoplastic compositions into an encapsulated resinous structure comprising a body defining: a generally rectangular shaped core passage suited to pass a first resinous material therethrough extending from an inlet to a first outlet; and a hollow coating passage of a generally rectangular configuration generally coaxially positioned around the core passage and spaced apart from the core passage by a wall section, the coating passage having a feed port adapted to communicate with a second outlet surrounding the first outlet and suited to pass a second resinous material therethrough; the improvement comprising two spaced apart adjusting means in operative combination with an outer wall portion of the coating passage adapted to individually controllably alter the cross-sectional geometry of generally opposite transverse portions of the coating passage at least partially adjacent to the second outlet without altering the geometry of the first outlet by generally lateral movement of the wall portion of the coating passage, the adjusting means comprising an outer wall block positioned within a recess in a receiver of the body and a force applicator in operative combination with the outer wall portion, the force applicator being adapted to move the outer wall block in a direction generally normal to the axis of the core passage.

21. The feedblock of claim 20 wherein the adjusting means are adapted to independently alter the cross-sectional geometry of a transverse portion of the coating passage to thereby minimize edge scrap loss of the second resinous material passed through the coating passage.

* * * * *